(12) United States Patent
Bryans et al.

(10) Patent No.: US 6,973,815 B2
(45) Date of Patent: Dec. 13, 2005

(54) MONOLITHIC PART AND PROCESS FOR MAKING THE SAME

(75) Inventors: Philip R. Bryans, Mounds View, MN (US); John C. Kelly, Centerville, MN (US); Alan K. Doerer, Shoreview, MN (US); Thomas M. Dolezal, Grant, MN (US)

(73) Assignee: Remmele Engineering, Inc., New Brighton, MN (US)

( * ) Notice: Subject to any disclaimer, the term of this patent is extended or adjusted under 35 U.S.C. 154(b) by 0 days.

(21) Appl. No.: 10/457,911

(22) Filed: Jun. 10, 2003

(65) Prior Publication Data

US 2004/0101655 A1 May 27, 2004

Related U.S. Application Data

(63) Continuation of application No. PCT/US01/48176, filed on Dec. 10, 2001.
(60) Provisional application No. 60/254,915, filed on Dec. 12, 2000.

(51) Int. Cl.[7] .................... B21D 53/92; B23P 13/00
(52) U.S. Cl. .......................... 72/340; 29/557
(58) Field of Search ............... 72/341, 340; 29/557, 29/558; 244/123

(56) References Cited

U.S. PATENT DOCUMENTS

| | | | |
|---|---|---|---|
| 1,335,808 A | | 4/1920 | Whitney |
| 2,814,101 A | * | 11/1957 | Prough et al. ............. 72/342.8 |
| 2,991,552 A | | 7/1961 | Chatfield |
| 3,416,756 A | * | 12/1968 | Windecker .................. 244/123 |
| 3,974,677 A | | 8/1976 | Castellani et al. |
| 5,083,008 A | | 1/1992 | Zerver |
| 5,262,220 A | | 11/1993 | Spriggs et al. |
| 5,813,107 A | | 9/1998 | Chen |
| 5,996,390 A | | 12/1999 | Tsujikawa et al. |
| 6,052,902 A | | 4/2000 | Lyon |
| 6,190,484 B1 | | 2/2001 | Appa |

* cited by examiner

Primary Examiner—Daniel C. Crane
(74) Attorney, Agent, or Firm—Dorsey & Whitney LLP

(57) ABSTRACT

The present invention provides a process for producing a monolithic product wherein a piece of stock is formed, then machined. The invention encompasses a monolithic product made by the process.

11 Claims, 14 Drawing Sheets

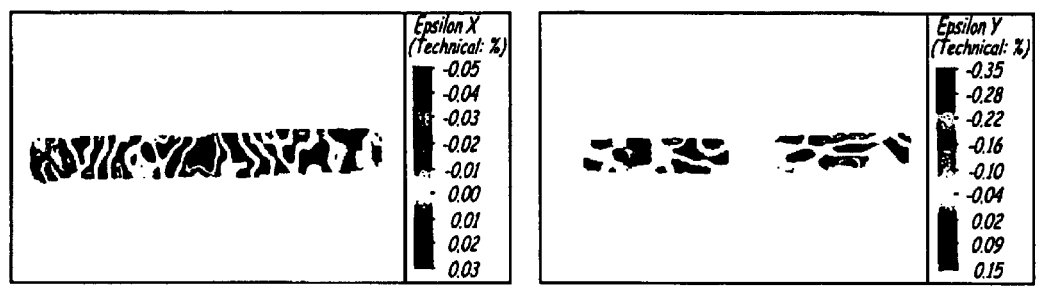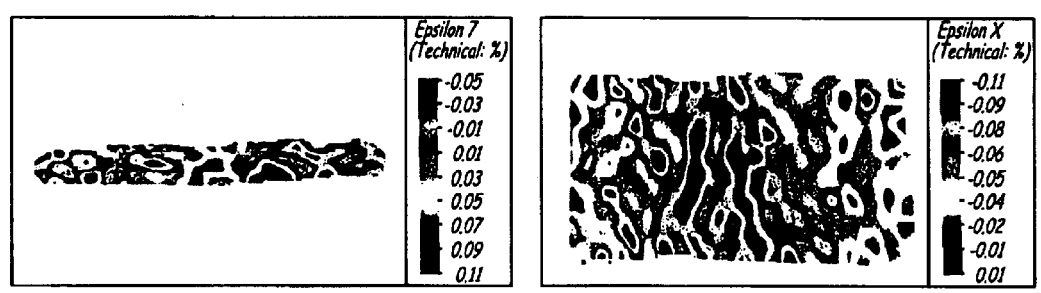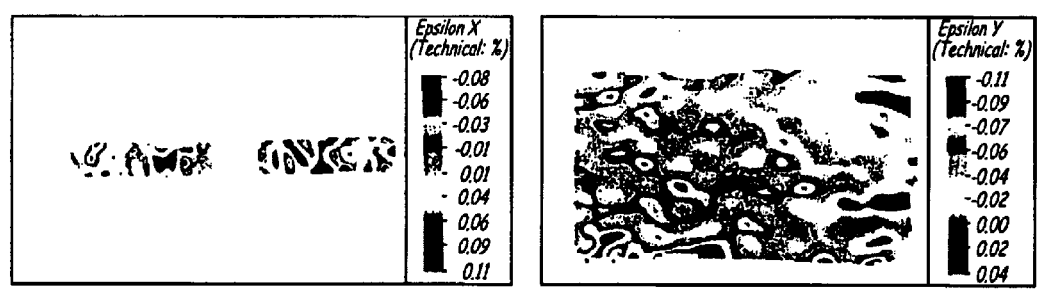
FIG. 9

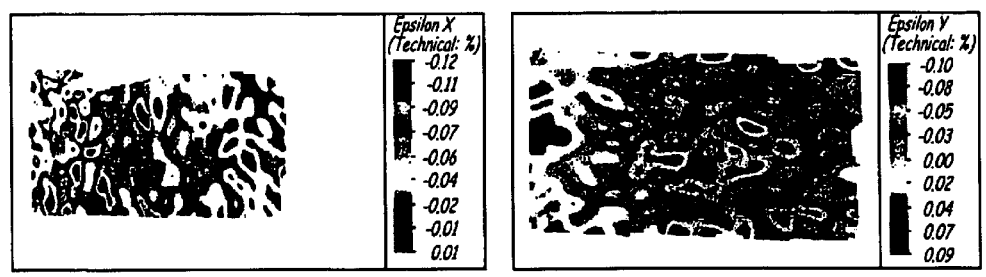
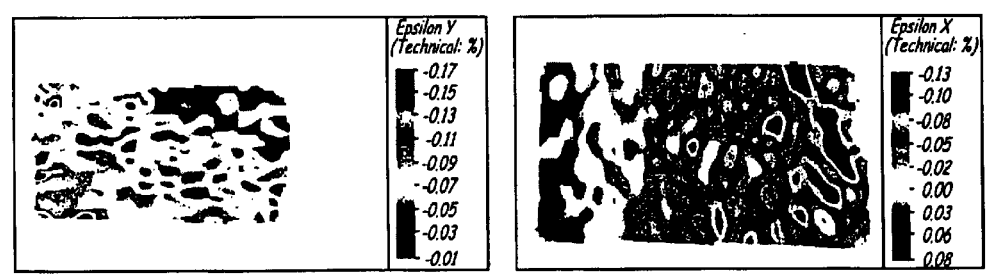
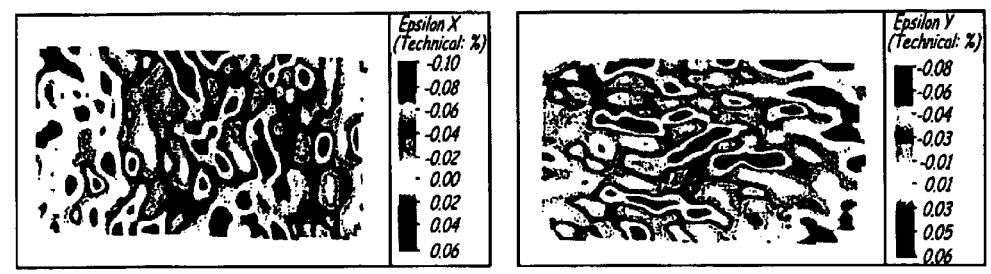
FIG. 10

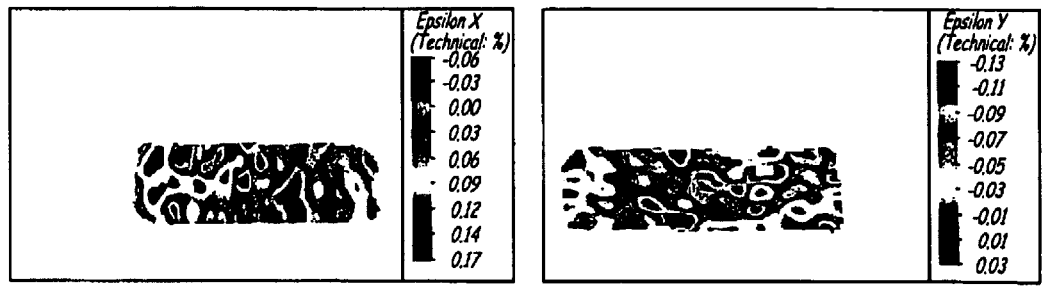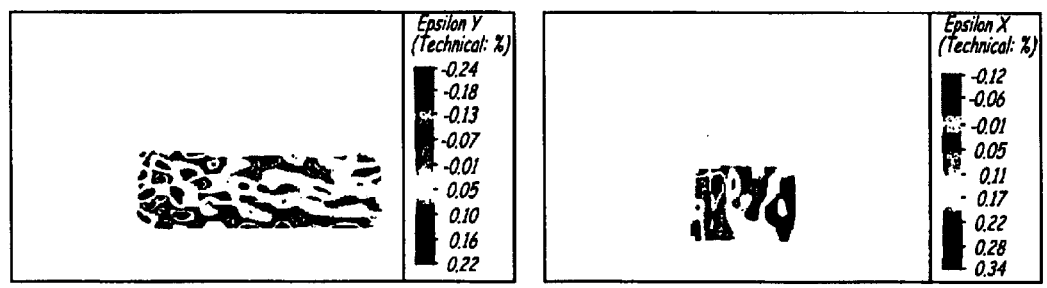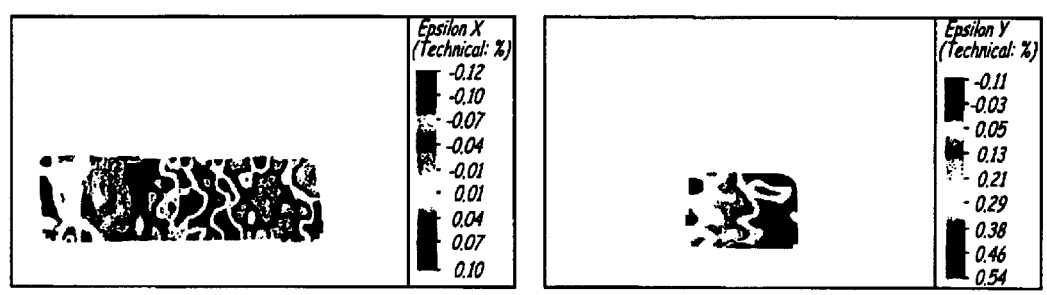
FIG. 13

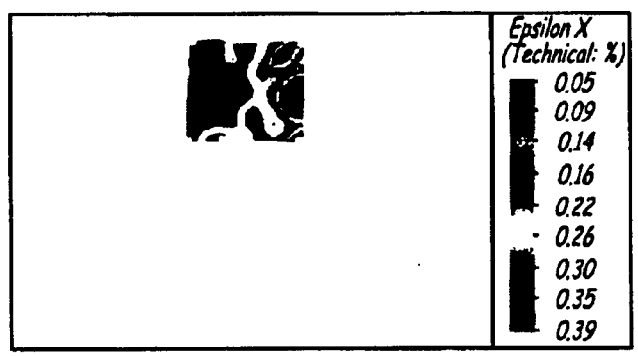
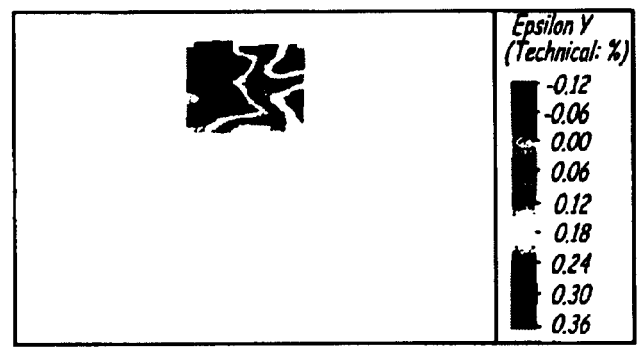
FIG. 14

MONOLITHIC PART AND PROCESS FOR MAKING THE SAME

CROSS-REFERENCE TO RELATED APPLICATION(S)

This application is a continuation of International Application No. PCT/US01/48176 filed on Dec. 10, 2001, which claims priority to U.S. Provisional application 60/254,915, filed on Dec. 12, 2000, the contents of both applications are herein incorporated by reference. The international application was published under PCT Article 21(2) in English.

BACKGROUND OF THE INVENTION

The present invention relates to processes for making products and to the products made by the processes. More particularly, it relates to processes and/or methods and apparatus for forming and machining a piece of stock or a work piece to produce a monolithic product, particularly a product comprising integral skin and frame or skeleton portions, and more particularly, a product suitable for use in the aircraft industry and comprising integral skin and frame portions.

Currently, the majority of structural members, particularly aircraft skin and airframe structural members, are built up from sheet metal using a frame structure (e.g., stringers and ribs), then attaching a skin to the frame structure using mechanical fasteners such as rivets or the like. In the aircraft industry, structures made in this manner may be referred to as "stick built" or "built up" structures.

In the aircraft and other industries, there are parts and components, including plates, skins, hull and/or shell members, machined whole from plate material, castings and forgings, and extrusions. Such parts and components may comprise non-metallic composite parts, but, regardless of the material, historically and generally they are connected to frame structures using mechanical fasteners. Particularly referring to aircraft and/or airframe structures, such as wing skins, such structures would generally be machined, formed and then assembled. The assembly generally consists of stringers and/or ribs being mechanically fastened to a wing skin material after forming the wing skin. The purpose of the stringers and ribs is to support and stiffen the finished structure.

The use of monolithic structures, including aircraft airframe structures, as a replacement for "stick built" structures is known. Generally, a common approach has been to machine a structure or component, for example a skin plate, complete from a selected piece of raw material. This process has also included finish machining and then final forming to achieve the desired shape, including "shot-peen forming" and/or "plier forming." One problem with this approach is that there may be significant residual stress in the product, and this may lead to increasing the cross-section of frame members or the skin itself to meet required tolerances and safety requirements.

It would be advantageous if a monolithic wing skin could be created to incorporate, by machining, the stringers and ribs into the finished product thereby eliminating a number of fasteners, and the labor required by the fastening process. It would be desirable if such a monolithic wing skin could be machined from a single piece of material thick enough to produce the desired shape without any forming of the material. Historically, however, a limitation to this approach has to do with the raw material properties of thick plate. For example, a thick aluminum plate does not have the same physical characteristics throughout its cross section. As a result, material limitations and strength requirements drove designs to thicker and heavier cross sections, particularly of the ribs and stringers, thereby introducing a weight penalty associated with known methods of making monolithic parts.

U.S. Pat. No. 4,941,338 is directed to a device for cold forming of ferrous and non-ferrous metal sections. In the process, pre-tensioning is applied to an initially essentially straight metal section, which is clamped at both ends. The tensioned metal section is bent in a rotating bending tool, and in order to achieve three-dimensional forming of the metal section, the bending tool effects a controlled movement in three spatial axes, whereby the metal section is pressed with a backlash-free guide system, at least in the forming region against the bending tool and guided by positive engagement.

U.S. Pat. No. 3,861,009 is directed to a process and apparatus for forming structural members wherein a continuous cold forming process is provided for making structural members from a strip of expandable metal.

U.S. Pat. No. 6,071,360 is directed to controlled strain rate forming of thick titanium plate. Although it involves forming a plate, then completing a part by machining the formed plate, the forming takes place at an elevated temperature.

BRIEF SUMMARY OF THE INVENTION

In one embodiment, the present invention comprises forming and then machining a work piece to form a monolithic product, e.g., a wing skin for an aircraft.

In some embodiments, the present invention provides a process for producing a product wherein a piece of stock is provided, rough machined, formed, clamped for semi-finish machining, semi-finish machined, released and reclamped, and finish machined, and encompasses a monolithic product made by the process.

In one embodiment, the present invention provides a method for forming a monolithic part, and encompasses such a part. In one embodiment, the invention involves combining cold forming of relatively thin raw material with machining to provide a curved monolithic product. One example of such a monolithic product is a single-piece airframe structural member comprising a support structure and an integral skin structure.

In some embodiments, the machining step comprises the use of high velocity machining technology, which comprises a suitable machining device and tool moving at a relatively high rate of speed across or over the surface of a work piece, with the tool or working head operating at a relatively high rate of revolution. Machines or apparatus suitable for accomplishing this type of machining include the type manufactured by Forest-Line (Capdenac, France) or Ingersoll (Rockford, Ill.). The operational parameters, specifications and operational software associated with this type of machine are incorporated herein by reference. Generally, high velocity of machining has less impact to the material than conventional machining which can release or impart further stresses to the material. Because of this, parts formed then conventionally machined may continue to distort after each machining operation. Further, this may be seldom predictable and/or repeatable. This is why, conventionally and historically, parts are machined, then formed. In contrast, high velocity machining operates within selected, developed and controlled parameters, for example, minimum surface feet per minute may exceed about 5,000, with spindle speeds over 20,000 RPM. Parameters must be selected to maintain acceptable chip load on the cutting tool, minimizing the cold working and galling of a machined surface which will typically be found in conventionally machined parts. High velocity machining cuts more freely, shearing material, and induces less stress into the work piece. Thus, any distortion of the formed work piece after machining is reduced when compared to conventional machining, and the movement of the work piece after machining is more predictable, and may be calculated into the overall manufacturing process.

An advantage of the process and product of the present invention is that it provides a thinner final monolithic product which has strength and weight advantages over thicker type products produced on conventional machines. This means that designs with thinner walls and less weight may be provided and approved for use.

Another advantage of the product and process of the present invention is that the accuracy of the finished monolithic part is improved. In this instance, the process involves forming and then machining. If, as in the case of the prior art, the parts are machined, then formed, there may be a variation in how much the machined part will elongate during forming. While this can be predicted to a certain degree, the tolerance band will be wider (approximately 3–4 times minimum) over the accuracy that can be achieved by finished machining to size after the forming, and its associated elongation or other distortion, have taken place.

Another advantage of the product and process of the present invention is the weight reduction of the finished monolithic part. Weight is reduced by the elimination of fasteners, typically used to connect skin or panel members and structural framing into a single piece, and to connect such pieces to form a larger portion of a structure, for example an aircraft body. This is related to the accuracy advantage, and the inherent accuracy of final machining after forming, which will allow larger parts to be produced without undue concern for overall part accuracy.

In some embodiments, the present invention involves forming, then machining to provide a monolithic final product. When compared to prior art methods involving a non-formed part being machined out of a monolithic plate of raw material, the thick plate used in prior art methods will require thicker cross sections in the part to achieve the same strength as the thinner cross sections produced by the method of the present invention. Thicker cross sections result in weight penalties associated with the final product, a problem the present invention addresses.

In some embodiments, the process of the present invention comprises cold forming and high velocity machining. Forming prior to machining is a departure from the prior art, particularly when combined, in some embodiments, with the use of high velocity machining. High velocity machining has much less impact on the raw material than conventional machining. Conventional machining can release or create further stresses in the parent material. Because of this, products or parts formed, then conventionally machined may continue to distort after the machining operation. Further, this type of distortion is seldom predictable and/or repeatable. Because of this problem, the standard practice in producing monolithic parts has traditionally been machining then forming. High velocity machining on the other hand, produces better results by operating within certain developed parameters. For example, high velocity machining truly shears the material, resulting in less stress being induced into work pieces. Because of this, the distortion of the formed work piece after machining is much reduced when compared to the product of conventional machining.

Also, the subsequent movement of the work piece after machining is more predictable and can be built into the process and product.

One feature of the present invention is to provide a process comprising forming, then machining, and a product of the process, wherein the product exhibits the same or less residual stress compared to the products produced by known processes, i.e., machining then forming.

Another feature of the present invention is a process and a product of the process, wherein there is tensile stress on the outer skin side of a product, and wherein there are compressive stresses on the inside, integral supporting structure.

In some embodiments, the present invention provides a monolithic product, particularly a product suitable for use in the aircraft industry, wherein the product comprises a skin with integral ribs and/or stringers, and wherein the product has a built in radius.

In some embodiments, the present invention provides a process for producing a monolithic product wherein the process comprises the steps of pre-forming or shaping a work piece, then machining the work piece.

A feature of the process of the present invention is that it may be performed on five axes with minimal residual stress in the product and with generally uniform stress throughout the product.

In one embodiment, the present invention is a method of making a monolithic final product comprising the steps of providing a form, rough machining the form, forming the form, and final machining the form.

In another embodiment, the present invention comprises a method of cold forming and machining monolithic aluminum components. In the process, stock plate may be first rough machined, leaving enough material to provide for cleanup or finish machining and for desired features such as wall and floor features. Gauge points and attachment features, such as tooling holes, tapped holes and the like, may be provided or machined into the work piece. Next, the part is formed using a hydraulic press brake or the like. Initially, the part is over formed beyond the final desired contour or shape. Next, the work piece is formed back to the final desired contour in an effort to reduce the residual stress from the first forming operation. The part is then fixtured (i.e., clamped or otherwise held relative to a forming fixture or device or machine tool) for semi-finish machining; preferably, this is accomplished without inducing any deflection into the part. The part is semi-machined and clamping is released, the part being allowed to find a neutral position or condition, then reclamped, again preferably without inducing any deflection. Next, the part is finish machined, in some embodiments, to the point where the final machined contour is such that any residual movement in the part (or work piece) during finish machining leaves the finished part and/or part surface within selected tolerances. Next, the part is turned over, fixtured and clamped by vacuum or mechanical means and all remaining features are finish machined. The part is released from the fixture, deburred and finish treatments may be applied, peripheral equipment or attachments may be attached, and/or a number of finished monolithic parts may be assembled to form a desired structure, e.g., an aircraft wing, a portion thereof, or another portion of an aircraft.

In one embodiment, the present invention comprises a method of forming and machining wing skins (and/or aircraft body portions, airfoil skins, doors, fuselage panels, or the like) suitable for use in the aircraft industry, wherein the wing skins are machined to a final shape. In some embodiments, the product of the process, i.e., the wing skins, may have or contain integral stiffeners and ribs on the inside. In some embodiments, a suitable material for use in the process is a 7000 series aircraft aluminum alloys with a heat treatment of T7451. In some embodiments, the selected material is cold formed, meaning no heat is applied to the material during the process; in some embodiments, the material is formed and processed in a state wherein it was previously heat treated. Further, in the process of the present invention, the selected material need not be subjected to subsequent heat treatments or annealing operations, and the amount of over forming and bending back is may be selected and controlled.

Other features and advantages of processes and products of the present invention will become more fully apparent and understood with reference to the accompanying description, drawings and claims.

BRIEF DESCRIPTION OF THE DRAWINGS

FIGS. 9–14 are graphs illustrating the residual stresses present in the product of FIG. 8.

DETAILED DESCRIPTION

The accompanying Figures and this description depict and describe embodiments of a process or method and a product or products produced thereby in accordance with the present invention, and features, steps and components thereof. As used herein, the term "monolithic" is intended to mean comprising a substantially single unit which, in some embodiments, may be a single piece formed, composed or created without joints or seams and comprising a substantially, but not necessarily rigid, uniform whole. In some embodiments, the monolithic product of the process of the present invention may be undifferentiated, i.e., formed of a single material, and it may comprise integral structures or features such as a substantially continuous skin having an outer surface or side and an inner surface or side, and integral support members such as ribs or thickened portions comprising frame members on the inside surface of the skin. As used herein, the term "machine" (including machining, machined, etc.) is intended to mean to process by or as if by machine, e.g., to reduce, make or finish by or as if by turning, shaping, planing or milling by machine-operated tools.

With regard to fastening, mounting, attaching or connecting components, associated features or peripheral equipment to the monolithic product of the present invention, and with regard to fastening, mounting, attaching or connecting the monolithic product of the invention to other such products or to other structures, unless specifically described otherwise, such are intended to encompass the use of conventional fasteners such as machine screws, nut and bolt connectors, machine threaded connectors, snap rings, detent arrangements, clamps such as screw clamps and the like, rivets, toggles, pins and the like. Connections may be made by adhesives, glues, welding, ultrasonic welding, and friction fitting or deformation, if appropriate, and appropriate liquid and/or airtight seal devices may be used. Electrical components, if any, may be selected and coupled appropriately. Unless specifically otherwise disclosed or taught, materials for making components of the present invention may be selected from appropriate materials such as metal, metallic alloys, vinyls, plastics and the like, and appropriate manufacturing or production methods may be used.

Any references to front and back, right and left, top and bottom and upper and lower are intended for convenience of description, not to limit the present invention or its components to any one positional or spacial orientation.

Figure 1:
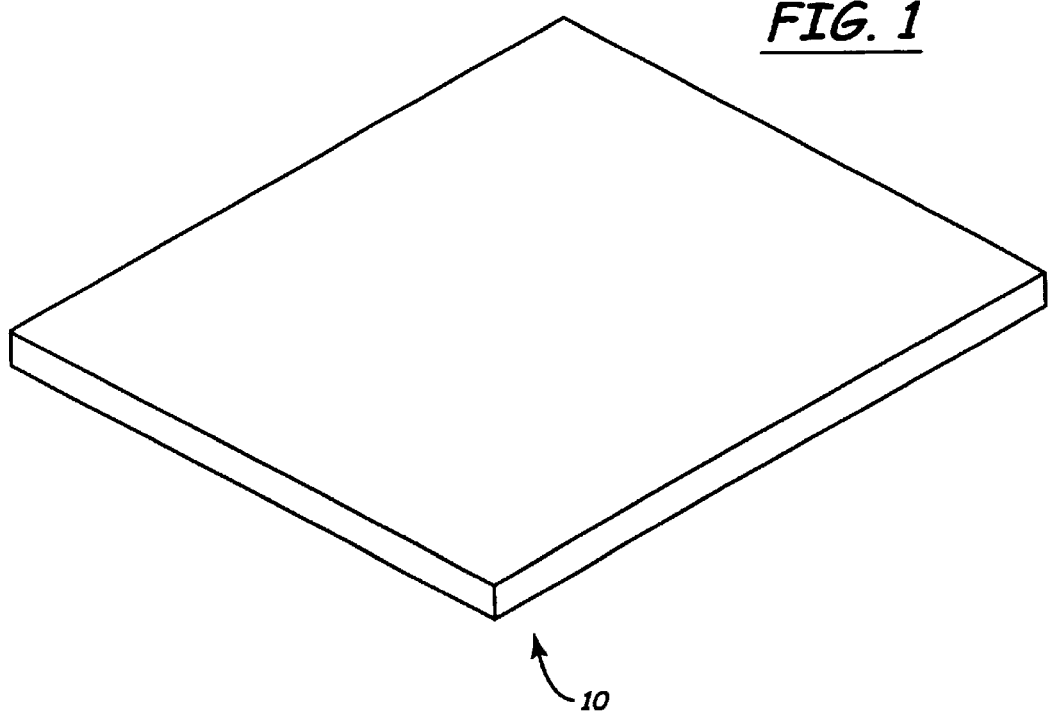
FIG. 1 depicts a piece of stock material or a work piece for use in the process of the present invention.
Figure 2:
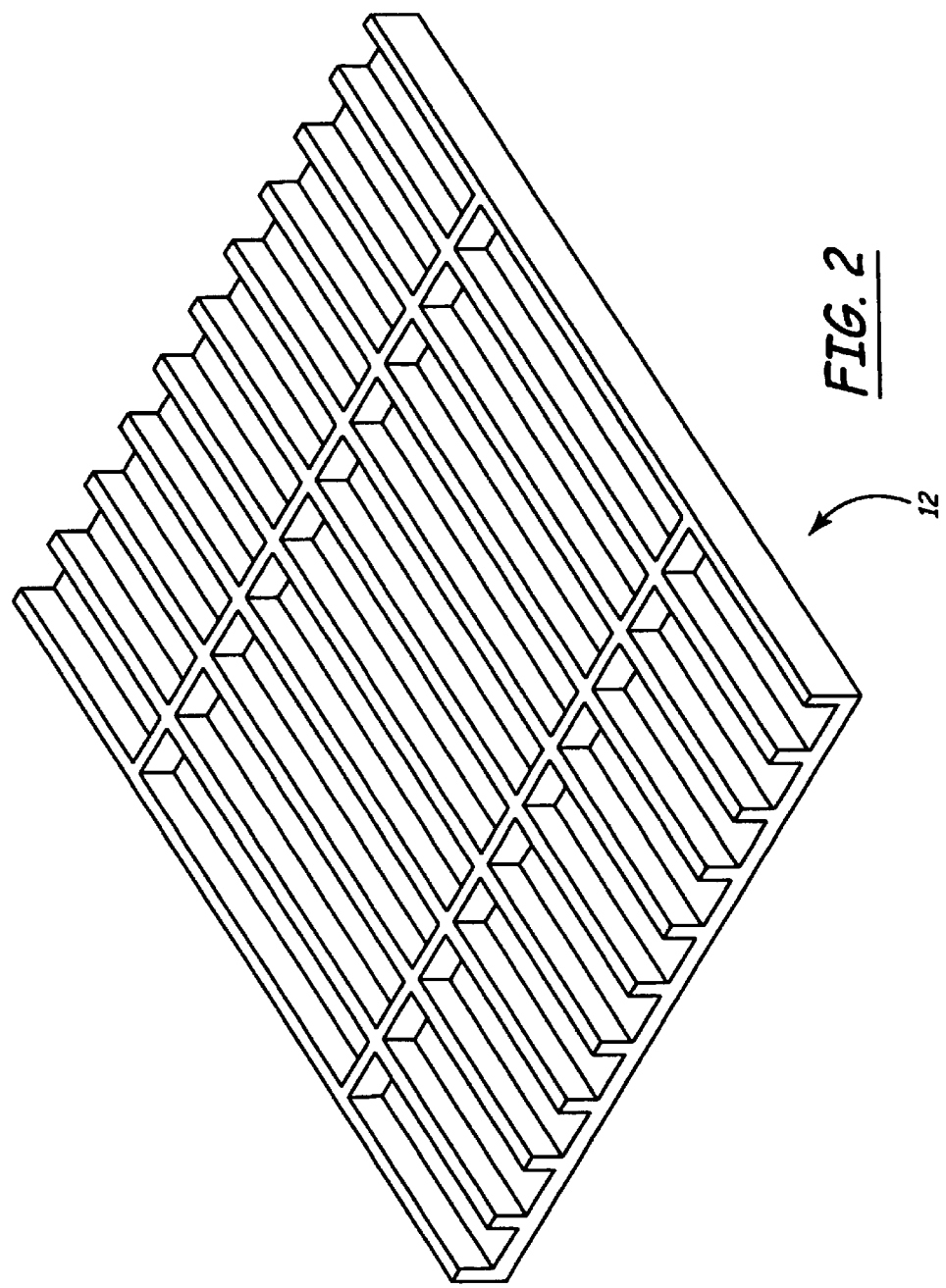
FIG. 2 depicts one embodiment of a product or part made by the process of the present invention.
Figure 3:
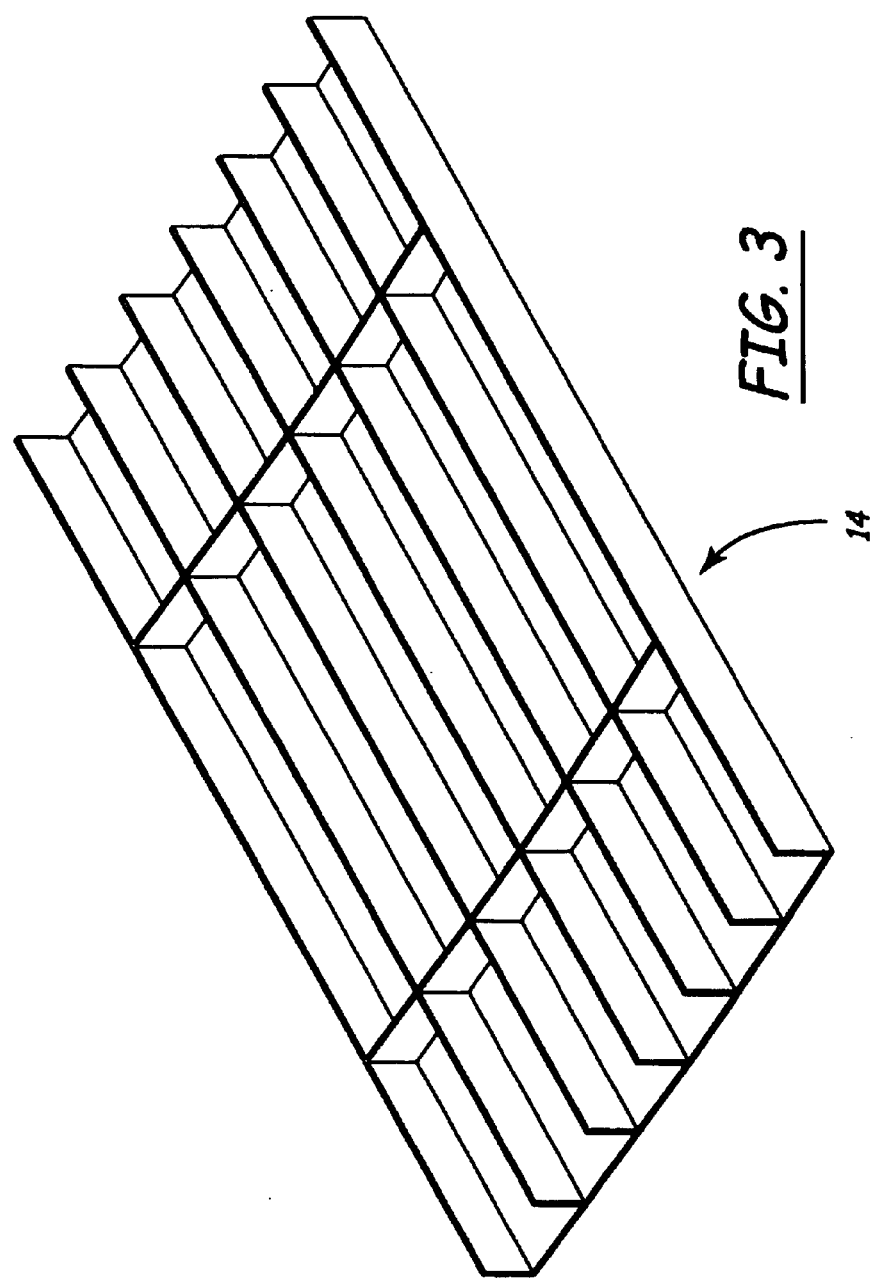
FIG. 3 depicts another embodiment of a product or part made by the process of the present invention.
Figure 4:
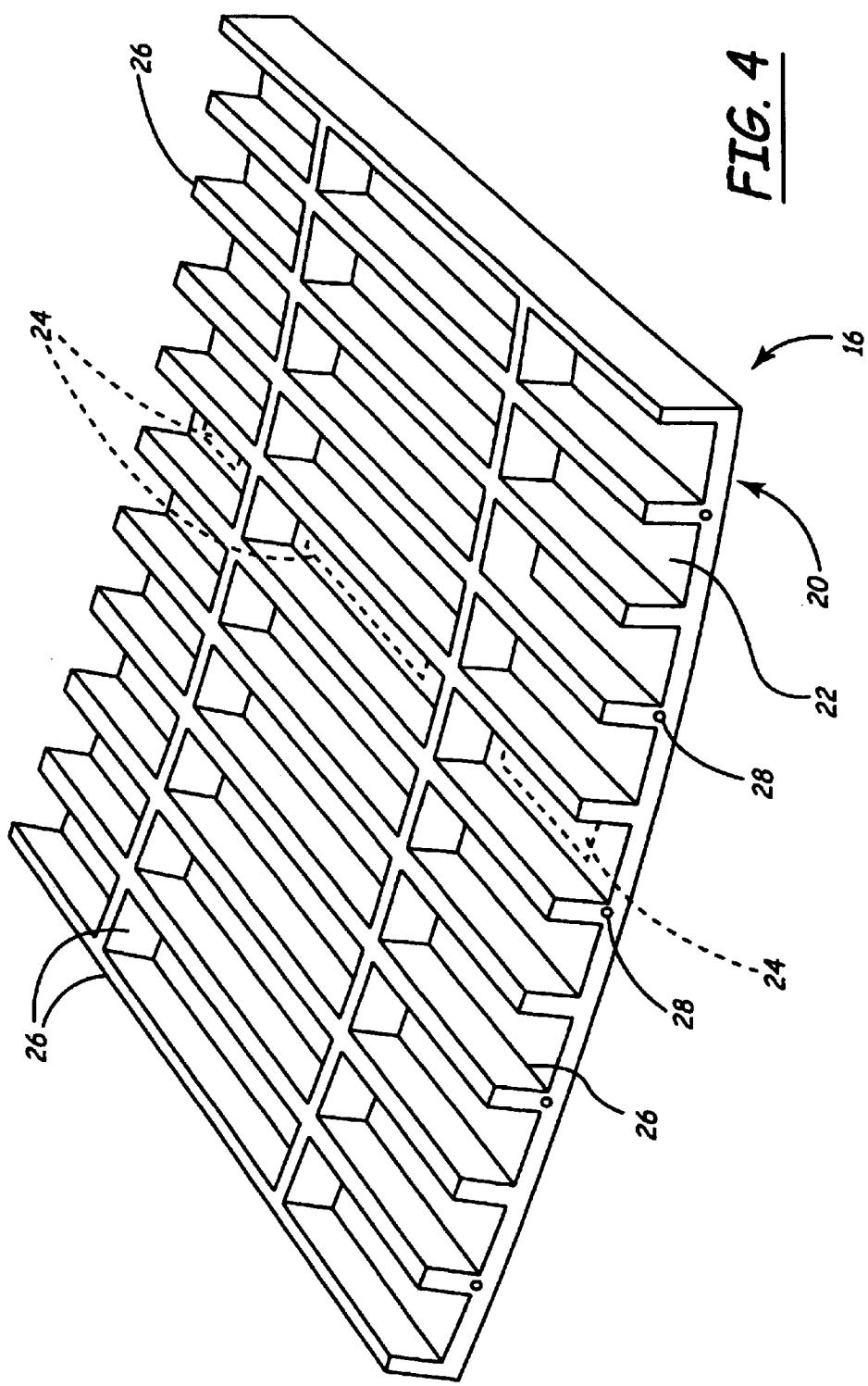
FIG. 4 depicts another embodiment of a product or part made by the process of the present invention.

Referring to the Figures, FIG. 1 depicts a piece of stock material or a work piece 10 for use in the process of the present invention, and FIGS. 2–4 depict exemplary embodiments of a product or part 12, 14 or 16 made by the process of the present invention. With reference to FIG. 4, the product 16 of the process of the present invention typically comprises a skin 18 having an outside surface 20 and an inside surface 22. Both surfaces 20, 22 may be substantially continuous, but also, in some embodiments, the product may include openings or relieved regions as desired (e.g., as exemplified in phantom at 24). The product 16 includes a plurality of ribs 26 (which also may be referred to as a frame, frame members, stiffeners or like terms) in a selected arrangement, typically on the inside surface 22. Suitable features, e.g., tapped holes 28, may be provided. The product 16 may be formed to have a selected curved or radiused shape as depicted.

Figure 5:
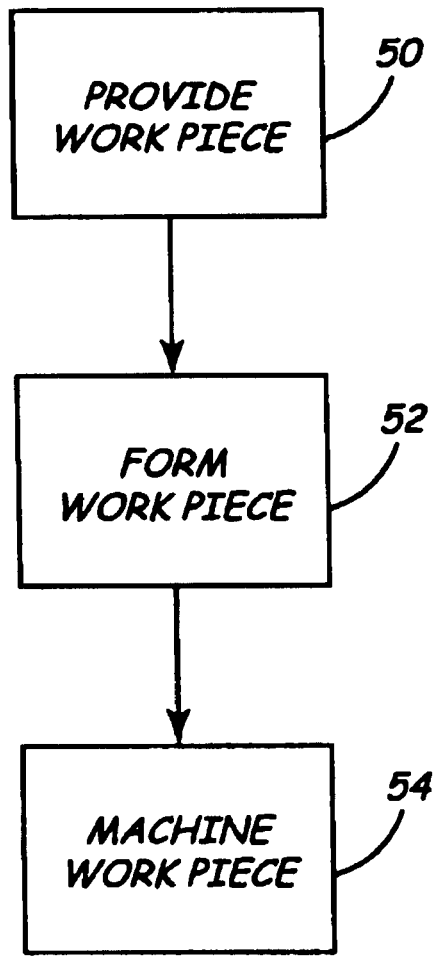
FIG. 5 is a block diagram depicting one embodiment of the process of the present invention.

FIG. 5 is a block diagram depicting one embodiment of the process of the present invention, wherein a work piece, e.g., the work piece 10 of FIG. 1, is provided 50, then formed or shaped 52, and then machined 54 to produce a monolithic product, or part, e.g., the products or parts 12, 14 or 16 depicted in FIGS. 2–4.

Figure 6:
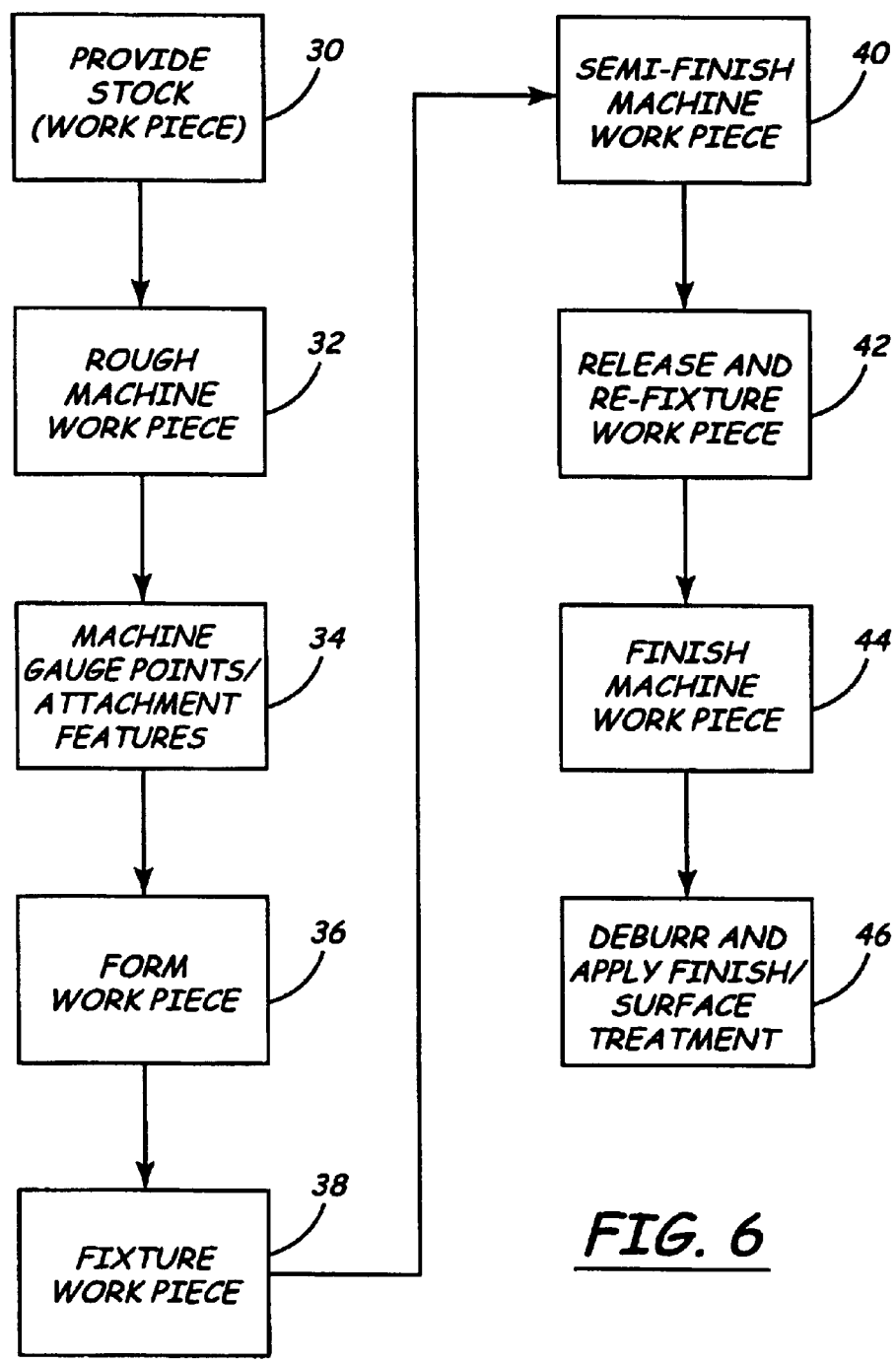
FIG. 6 is a block diagram depicting another embodiment of the process of the present invention.

FIG. 6 is a block diagram depicting another embodiment of the process of the present invention, wherein the process or method comprises providing a suitable, selected piece of stock material, e.g., stock piece or work piece 10, as represented at operation or function block 30. As represented at function block 32, the work piece 10 may be rough machined, leaving sufficient material to provide for later finish machining or provision of desired features. As represented at block 34, gauge points and/or attachment features, e.g., for connecting a product to one or more other products, may be created in the work piece. As represented at block 36, the work piece may be formed, pressed or shaped, e.g., using a hydraulic press brake or other suitable machine (not shown).

Figure 7:
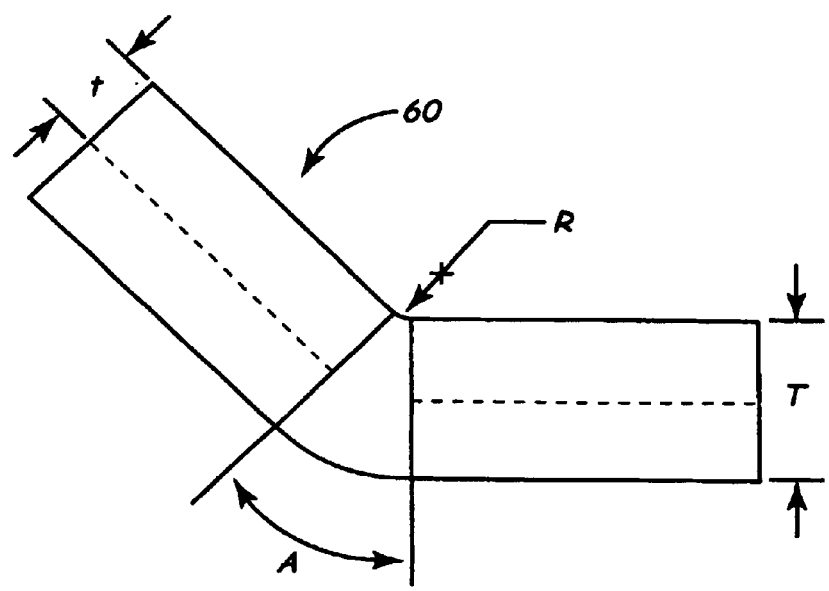
FIG. 7 is a schematic illustration representing a K-factor calculation.

In some embodiments of the present invention, the work piece may be "cold formed." In so doing, calculations should be performed to determine the amount of elastic deformation that can occur without substantially affecting the physical properties of the work piece. Such calculations are based on formulas developed within various industries that utilize cold forming processes. FIG. 7 illustrates a workpiece 60 that has been cold formed. The K-factor is a ratio that represents the location of the neutral sheet with respect to the thickness of the metal part. The bend allowance (BA) using a K-factor is:

$$BA=\pi(R+KT)A/180; \text{ where}$$

BA=bend allowance
R=inside bend radius
K=K-factor, which is t/T
T=material thickness
t=distance from inside face to neutral sheet
A=bend angle in degrees (the angle through which the material is bent)

In some embodiments, the work piece may be over formed beyond the specified final shape or contour of the product, then formed back to the final contour to minimize residual stress from the first forming step. Referring to block 38, the work piece may be "fixtured" or held, e.g., by clamping, for semi-finish machining, block 40. Preferably, the clamping or fixturing is accomplished in a manner which induces as little as possible deflection into the work piece. After semi-finish machining, block 40, the work piece may be released, allowed to find a neutral configuration or condition, then re-fixtured, block 42, again preferably without inducing any deflection. The work piece is then finished machined, block 44. Preferably, finish machining is used to produce a final machined contour, shape or configuration such that any residual movement in the work piece during finish machining leaves the finished surface in selected tolerance. Finish machining, block 44, may include releasing the work piece, repositioning it, refixturing it and continuing finish machining if, for example, the work piece requires finish machining on both sides, as well as finish machining of any other selected machined features. As represented at block 46, the work piece, which now may be referred to as the product or part which is the end result of the process of the present invention, e.g., parts 14, 16 of FIGS. 3 and 4, may be released from the fixture or holding device, deburred, coated or otherwise treated (e.g., painted, sprayed, dipped, graphic or other indicia applied, etc.), and/or assembled (e.g., connected to other similar or different monolithic parts). Attachments (e.g., handles, flanges, seals, windows, etc.) may be mounted on the part either before shipment to a customer, or after a customer receives the part.

Figure 8:
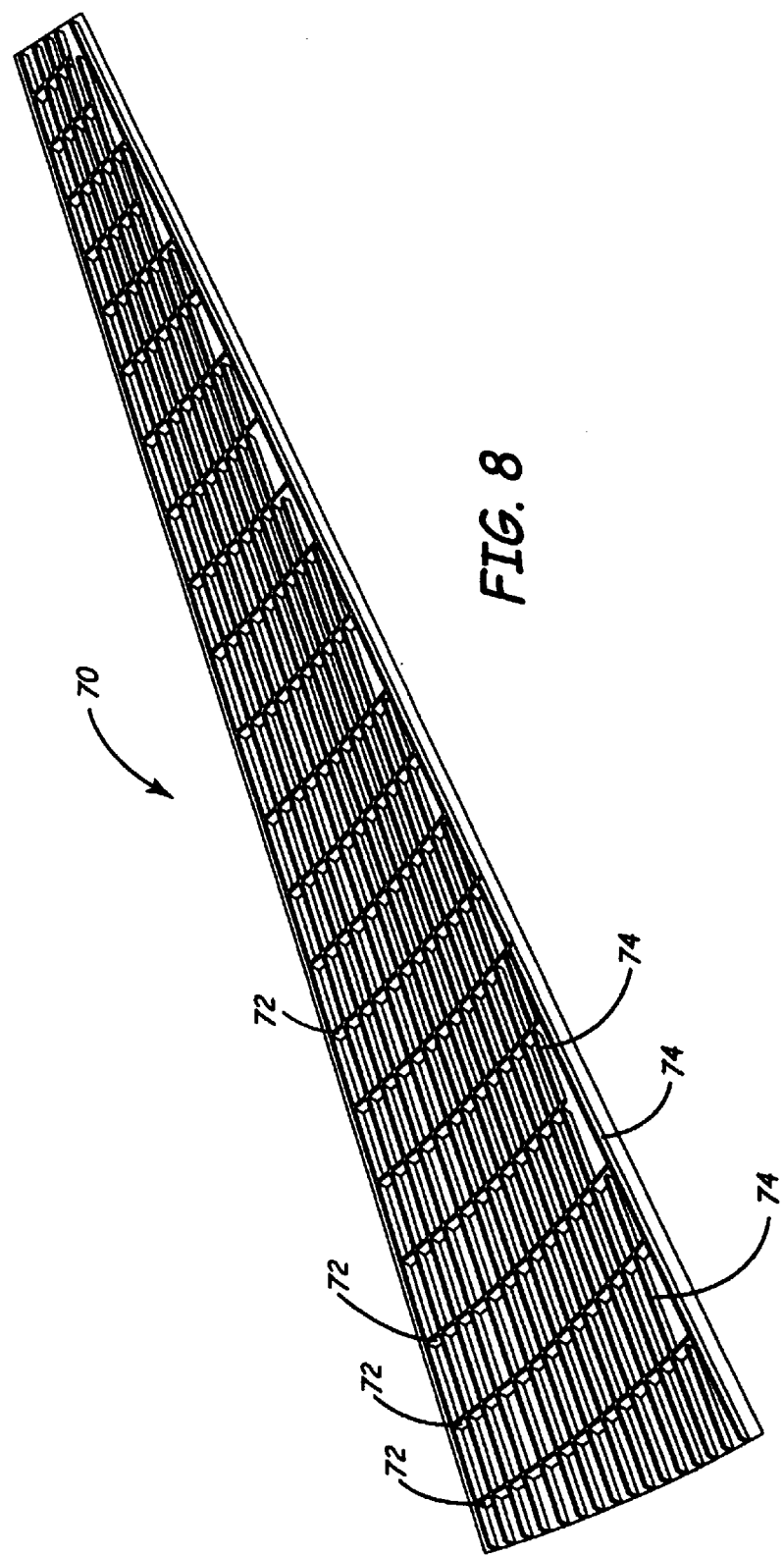
FIG. 8 depicts another embodiment of a product or part made by the process of the present invention.
Figure 11:
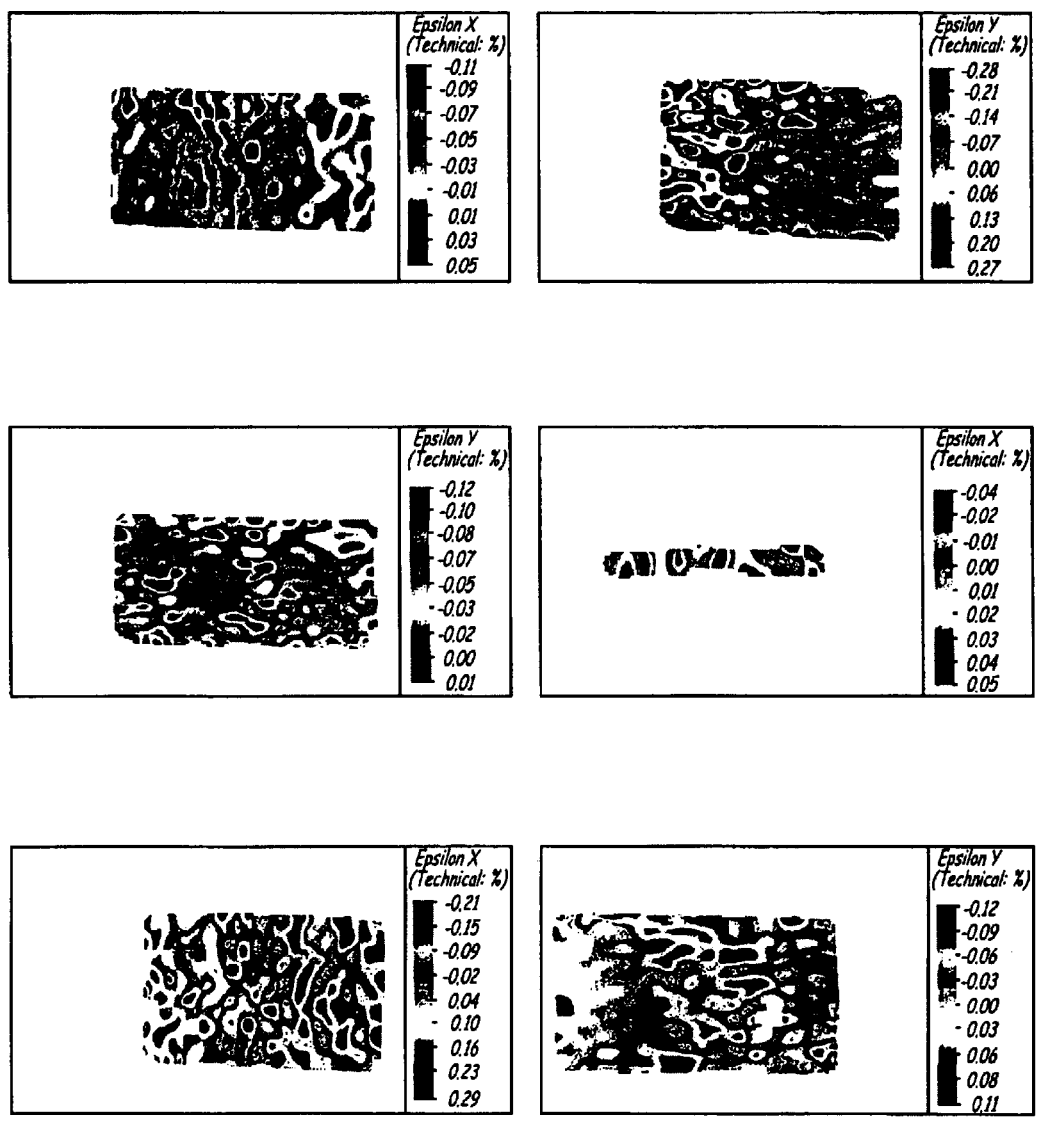
Figure 12:
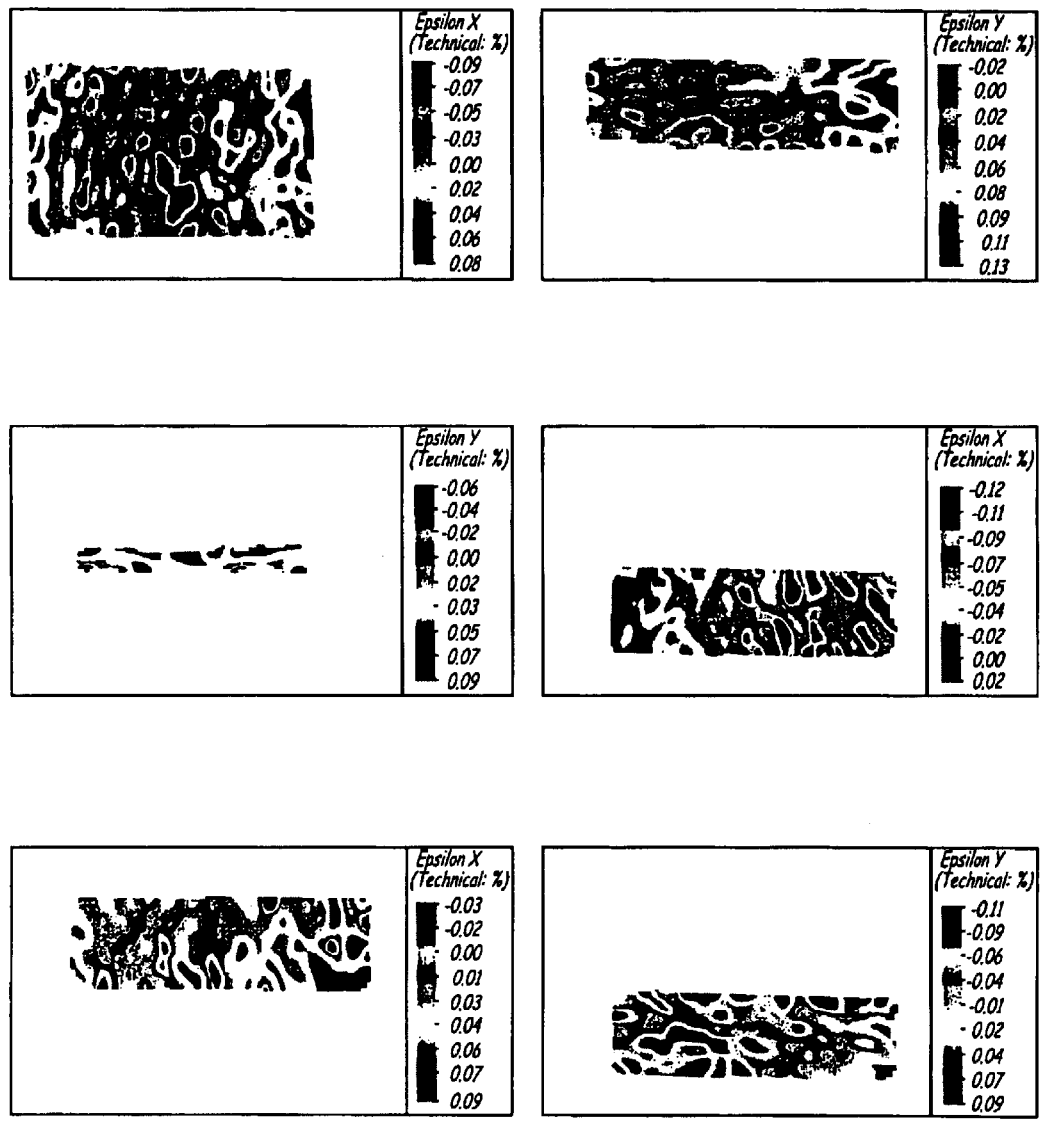

FIG. 8 illustrates a monolithic product 70 produced by processes consistent with the principles of the present invention. Product 70 includes a plurality of ribs 72 running substantially parallel to one another and a plurality of stringers 74 running parallel on one another. Ribs 72 and stringers 74 are angled with respect to one another. In the instance illustrated, ribs 72 are perpendicular to stringers 74. Through the process of the present invention, both ribs 72 and stringer 74 have reduced amounts of residual stress. Previously known methods could produce a product having stringers 74 having residual stresses within the required tolerances, but not ribs 72. Thus, the amount of residual stress in stringers 74 is improved upon and the amount of residual stress in ribs 72 is greatly improved upon through the present process. In particular, through the use of high velocity machining and final machining post-forming the amount of residual stress in ribs 72 is reduced.

More specifically, the graphs illustrated in FIGS. 9–14 illustrate the residual stresses found in one sample of product 70. The testing was conducted on optical strain gauge testing equipment produced by G O M mbH, a German company. The various graphs represent the complete product 70. The data is expressed in mpa (mega pascals). Within each graph, positive values equate to compessive stresses and negative values equate to tension stresses. As expected, some areas indicate both compressive and tension stresses. The indicated residual stresses, both compressive and tension, are reduced from similar components formed by other known techniques.

The process of the present invention may involve a work piece of any suitable material, suitably conveyed or carried to and from a suitable machining device or station, forming devices or stations, finishing devices or stations, assembly devices or stations and/or storage devices or stations. In some embodiments, there will be tensile stress on the outer skin side of the part produced by the process of the present invention, and compressive stresses on the inside integral supporting structure. This may be a result of the forming process and staying within prescribed limits of bend v. plate thickness by alloy and temper (so properties of the selected material are not comprised). Forming may be done cold, and may be performed sequentially across the part. Process parameters may be developed to produce a radius greater than finished size, including 15% of finished size. In some embodiments, the work piece may be under-formed, rather than over-formed. Residual stresses found in parts made by the process of the present invention may be similar, but less, that those found in parts made using prior art processes, i.e., conventional 3-axes machining first, then forming).

The present invention may be embodied in other specific forms without departing from the essential spirit or attributes thereof. Described embodiments should be considered in all respects as illustrative, not restrictive.

What is claimed is:

1. A process for producing a monolithic part comprising the steps of:

providing a piece of stock;

rough machining the piece of stock, leaving sufficient material to provide for finish machining;

forming the piece of stock, initially over forming the piece of stock beyond a final desired contour followed by forming the piece of stock to the final desired contour;

clamping the formed piece of stock for semi-finish machining, and semi-finish machining the piece of stock;

releasing the piece of stock, thereby allowing the piece of stock to find a neutral position;

reclamping the piece of stock; and finish machining the piece of stock.

2. The process according to claim 1, further comprising releasing, deburring and applying finish treatments to the piece of stock.

3. The process according to claim 2, wherein said steps are performed in the order recited.

4. The process according to claim 1, further comprising machining gauge points and attachment features into the piece of stock.

5. The process according to claim 1, wherein the piece of stock is over formed beyond its intended final shape, then formed back to its final shape.

6. A process for producing a monolithic part comprising the steps of:

providing a piece of stock, rough machining the piece of stock;

forming the piece of stock;

clamping the formed piece of stock for semi-finish machining, and semi-finish machining the piece of stock;

releasing and reclamping the piece of stock; and finish machining the piece of stock;
wherein the monolithic part comprises a skin portion and a support frame portion.

7. The process according to claim 6, wherein the skin portion and support frame portion are integral.

8. A process for forming a monolithic part comprising:
providing a work piece;
rough machining the work piece leaving sufficient material for finish machining;
over-forming the work piece through cold forming, wherein the work piece is overformed;
forming the over-formed work piece to a desired shape to reduce residual stress occurring in the over-formed shape; and
finish machining the work piece using high velocity machining.

9. The process of claim 8, further comprising:
semi-finish machining the work piece prior to finish machining the work piece;
releasing the work piece after semi-finish machining; and
reclamping the work piece prior to finish machining.

10. A process for forming a monolithic part comprising:
providing a work piece;
rough machining the work piece leaving sufficient material for finish machining;
over-forming the work piece through cold forming, wherein the work piece is overformed;
forming the over-formed work piece to a desired shape to reduce residual stress occurring in the over-formed shape, wherein forming the work piece includes utilizing a hydraulic brake; and
finish machining the work piece using high velocity machining.

11. A process for forming a monolithic part comprising:
providing a work piece;
rough machining the work piece leaving sufficient material for finish machining;
over-forming the work piece through cold forming, wherein the work piece is overformed;
forming the over-formed work piece to a desired shape to reduce residual stress occurring in the over-formed shape; and
finish machining the work piece using high velocity machining;
wherein the work piece includes an inner surface having integrated ribs and integrated stringers, wherein the ribs and the stringers have residual stress levels within predefined parameters.

* * * * *